United States Patent
Durham et al.

(10) Patent No.: US 6,502,220 B1
(45) Date of Patent: *Dec. 31, 2002

(54) COMPLEMENTARY LOGIC ERROR DETECTION AND CORRECTION

(75) Inventors: Christopher McCall Durham, Austin, TX (US); Peter Juergen Klim, Austin, TX (US)

(73) Assignee: International Businesss Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/270,182

(22) Filed: Mar. 15, 1999

(51) Int. Cl.[7] .................................................. H04L 1/08
(52) U.S. Cl. ........................ 714/823; 326/121; 326/129
(58) Field of Search ................................ 365/200–201, 365/230.05; 714/823, 724, 746; 326/121, 129

(56) References Cited

U.S. PATENT DOCUMENTS

| | | | |
|---|---|---|---|
| 4,694,274 A | * 9/1987 | Shimada et al. | 340/146.2 |
| 5,450,020 A | * 9/1995 | Jones et al. | 326/31 |
| 5,633,820 A | * 5/1997 | Beakes et al. | 708/682 |
| 5,777,491 A | * 7/1998 | Hwang et al. | 326/113 |
| 6,043,696 A | * 3/2000 | Klass et al. | 326/95 |
| 6,046,608 A | * 4/2000 | Theogarajan | 326/112 |

OTHER PUBLICATIONS

U.S. patent application Ser. No. 09/270,460, Durham et al., filed Mar. 15, 1999.

* cited by examiner

Primary Examiner—Albert Decady
Assistant Examiner—Guy Lamarre
(74) Attorney, Agent, or Firm—Casimer K. Salys; Bracewell & Patterson, L.L.P.

(57) ABSTRACT

A system and method for detecting and rectifying a proscribed non-complementary output from a complementary logic circuit. A complementary logic circuit having a true tree and a complement tree is provided. The true tree produces a true signal utilized to generate a true output signal from the complementary logic circuit. The complement tree produces a complement signal utilized to generate a complement output signal from the complementary logic circuit. Logic means coupled to the output of the complementary logic circuit detect an occurrence of a non-complementary output from the complementary logic circuit. Multiplexing means within the true tree is utilized to selectively replace the true signal with the complement signal within the true tree in response to detection by the logic means of a non-complementary output, such that a non-complementary output is seamlessly detected and rectified.

19 Claims, 16 Drawing Sheets

COMPLEMENTARY LOGIC ERROR DETECTION AND CORRECTION

CROSS REFERENCE TO RELATED APPLICATIONS

The present application is related to the following copending U.S. Patent Applications: U.S. patent application Ser. No. 09/270,468 filed on Mar. 15, 1999, titled "System and Method For Diagnosing And Repairing Errors In Complementary Logic". The above mentioned patent application is assigned to the assignee of the present invention. The content of the cross referenced copending applications are hereby incorporated herein by reference thereto.

TECHNICAL FIELD

The present invention relates in general to a system and method for ensuring that a complementary condition is maintained at the output of a complementary logic circuit. In particular, the present invention relates to a system and method that automatically corrects an illegal non-complementary condition at the output of a complementary logic circuit, thereby avoiding the unpredictability and uncertainty that result from a non-complementary output.

DESCRIPTION OF THE RELATED ART

As electronic circuit geometries decrease, testing for manufacturing defects becomes increasingly difficult. Many defects can be detected during manufacturing tests. However, some defects, such as resistive shorts between nets, resistive open contacts or excessive transistor leakage, cause only subtle effects that may not cause logical failure during an initial manufacturing test, but will cause failures at a later time. Quiescent power supply current (IDDq) testing has been utilized in the past to detect some of these subtle defects, but in deep sub-micron technologies, normal leakage currents are sufficiently high that it is becoming impossible to detect and identify small amounts of extra current caused by a defect.

Burn-in testing has been utilized in the past to accelerate early-life failures, but today's deep sub-micron technologies are less capable of tolerating the high voltage and temperature conditions utilized in burn-in testing. These trends mean that electronic circuit initial quality and long-term reliability are decreasing, thus forming a need for improved methods of defect detection and error correction to improve initial quality, and to make circuits more fault tolerant in operation.

As processor speeds climb, circuit designers are challenged to achieve higher circuit speeds to accommodate the demand. Techniques such as dynamic logic are suitable for such applications, but are susceptible to performance degradation due to subtle design and manufacturing defects such as noise coupling, charge sharing, and high leakage. Furthermore, debugging dynamic logic is a complex and costly task. Consequently, fast static logic families are becoming more prevalent in the industry today to counteract the difficult design issues that arise in dynamic logic. Also, with the advent of Silicon-On-Insulator (SOI) technologies, with its relatively low capacitive loading and the ability to increase the number of devices in series ("stack height"), static pass-gate logic is becoming very competitive with dynamic logic in circuit speed. In previous BULK CMOS technologies, the traditional limit on series N-type MOSFETs, commonly referred to in the art as "nfets", (the combination of transistors I1 and I3 or I1 and I4 of FIG. 1) has been two to three. However, in the newer SOI technologies, the limit on series nfets is climbing rapidly, and has already exceeded six. This trend is made possible by two advantageous characteristics of SOI technology: the device threshold dependency on the source-body voltage is removed; and the device diffusion capacitance is lowered by more than 66%.

Many of the fast static pass-gate logic families that are being utilized are complementary in nature, meaning that they produce both true and complement output signals, and circuit input signals are provided in both true and complement form. Examples of such families are Double Pass-transistor Logic (DPL), Differential Cascode Voltage Switch with Pass-Gate (DCVSPG), Complementary Pass-Transistor Logic (CPL), etc.

CPL circuits may be further categorized as belonging to one of two sub-classes: standard and cross-coupled. FIG. 1A depicts a prior art three way XOR/XNOR standard CPL circuit 100, while FIG. 1B illustrates a sample three way XOR/XNOR cross-coupled CPL circuit 150. Note in FIG. 1A that standard CPL circuit 100 utilizes small pmos feedback devices 110 and 112 from XOR output 102 and XNOR output 104 to internal node 106 and internal node 108 (TREE_T/TREE_C). Feedback devices 110 and 112 serve to draw the internal nodes 106 and 108 to full rail (up to VDD from VDD-VT). However, note that cross-coupled CPL circuit 150, of FIG. 1B, utilizes similar pmos devices 110 and 112, connected to complementary internal nodes 106 and 108 (TREE_T/TREE_C), which serve not only to draw the internal nodes full-rail but also increases circuit performance.

Note that in complementary logic circuits 100 and 150 of FIGS. 1A and 1B, input signals A 114 and A_ 116 are logical complements of each other, as are signal pairs B/B_ and C/C_. CPL, DCVSPG, and DPL circuits operate differentially. That is, when the input signals force one output high, the associated complementary output is forced low.

However, when a defect occurs in manufacturing or if a defect appears during circuit use, these outputs may no longer be complementary. When this happens, the circuits downstream of this defective circuit no longer see complementary input signals. These "illegal" input states can cause floating nodes (high-impedance, Z state) or value contention (1 and 0 driving onto a net simultaneously, for example) which will produce unpredictable circuit behavior. Thus, such a defect may not be detected during manufacturing testing. For example, if the A/A_ input signals in FIG. 1B are simultaneously at a non-complementary 0/0 state due to a defect in the circuit producing signals A/A_, nets TREE_T and TREE_C may be floating (undriven, high impedance) except for cross-coupled pfet devices 110 and 112. The values that will emerge at nodes 106 and 108 are unpredictable, thus making XOR output 102 and XNOR output 104 unpredictable. Likewise, if input signals A/A_ are simultaneously at a non-complementary 1/1 state due to a defect, nodes 106 and 108 (TREE_T and TREE_C) will be driven by contending high and low voltage values regardless of the values on the B and C input signals. The resultant voltages on nodes 106 and 108 may be at some value between the high and low voltage states for logic 1 and 0, thus causing complementary XOR/XNOR outputs 102 and 104 to be unpredictable. Most defects that cause an incorrect value at a single output of a complementary pass-gate circuit family will cause unpredictable behavior in downstream circuits, and are thus difficult to detect and identify during testing.

It would therefore be desirable to be able to automatically correct an illegal non-complementary output from a complementary logic circuit during circuit testing and use. Further, it would be desirable to provide a system and method for selectively decoupling one transistor tree within a complementary logic circuit and utilize the other tree to ensure a complementary condition at the output of a complementary logic circuit. Such a system and method, if implemented, would be useful by ensuring that a defect in a complementary logic circuit that would normally cause a non-complementary output may be overridden during runtime circuit operation, thus enhancing chip reliability and manufacturing yield.

SUMMARY OF THE INVENTION

It is therefore one object of the present invention to provide a system and method for ensuring that a complementary condition is maintained at the output of a complementary logic circuit.

It is another object of the present invention to provide a system and method for automatically correcting an illegal non-complementary condition at the output of a complementary logic circuit, thereby avoiding the unpredictability and uncertainty that result from a non-complementary output.

Some or all of the foregoing objects may be achieved in one embodiment of the present invention as is now described. A system and method for detecting and rectifying a proscribed non-complementary output from a complementary logic circuit is disclosed. A complementary logic circuit having a true tree and a complement tree is provided. The true tree produces a true signal utilized to generate a true output signal from the complementary logic circuit. The complement tree produces a complement signal utilized to generate a complement output signal from the complementary logic circuit. Logic means coupled to the output of the complementary logic circuit detect an occurrence of a non-complementary output from the complementary logic circuit. Multiplexing means within the true tree is utilized to selectively replace the true signal with the complement signal within the true tree in response to detection by the logic means of a non-complementary output, such that a non-complementary output is seamlessly detected and rectified.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The system and method of the present invention comprises modifying any family of complementary pass-gate circuits, whether in BULK or SOI technologies, such that a proscribed non-complementary condition that occurs at the output of such a circuit may be overridden. As a result, an incorrect value on one of a complementary pair of outputs caused by a defect in a true or complement transistor tree may be detected, corrected, and maintained in a complementary condition. Therefore, in accordance with the teachings of the present invention, a more fault resistant complementary logic circuit is created, such that if a defect causes the true/complement outputs assume an illegal 0/0 or 1/1 state, then one output will be utilized to automatically generate (repair) the other. Furthermore, if this repair operation is again unsuccessful (producing an illegal state), the circuit with then utilize the opposite signal to generate the first signal. In this manner, unpredictable circuit states are detected and repaired "on the fly" during system operation. Also, when a defect exists in either the true or complement transistor tree, the self repair circuitry allows both true and complement output signals to be ultimately generated by the defect-free tree (after either the first or second automatic repair operation). This allows the circuit to be repaired for manufacturing yield enhancement or for defect correction during use.

Figure 2A:
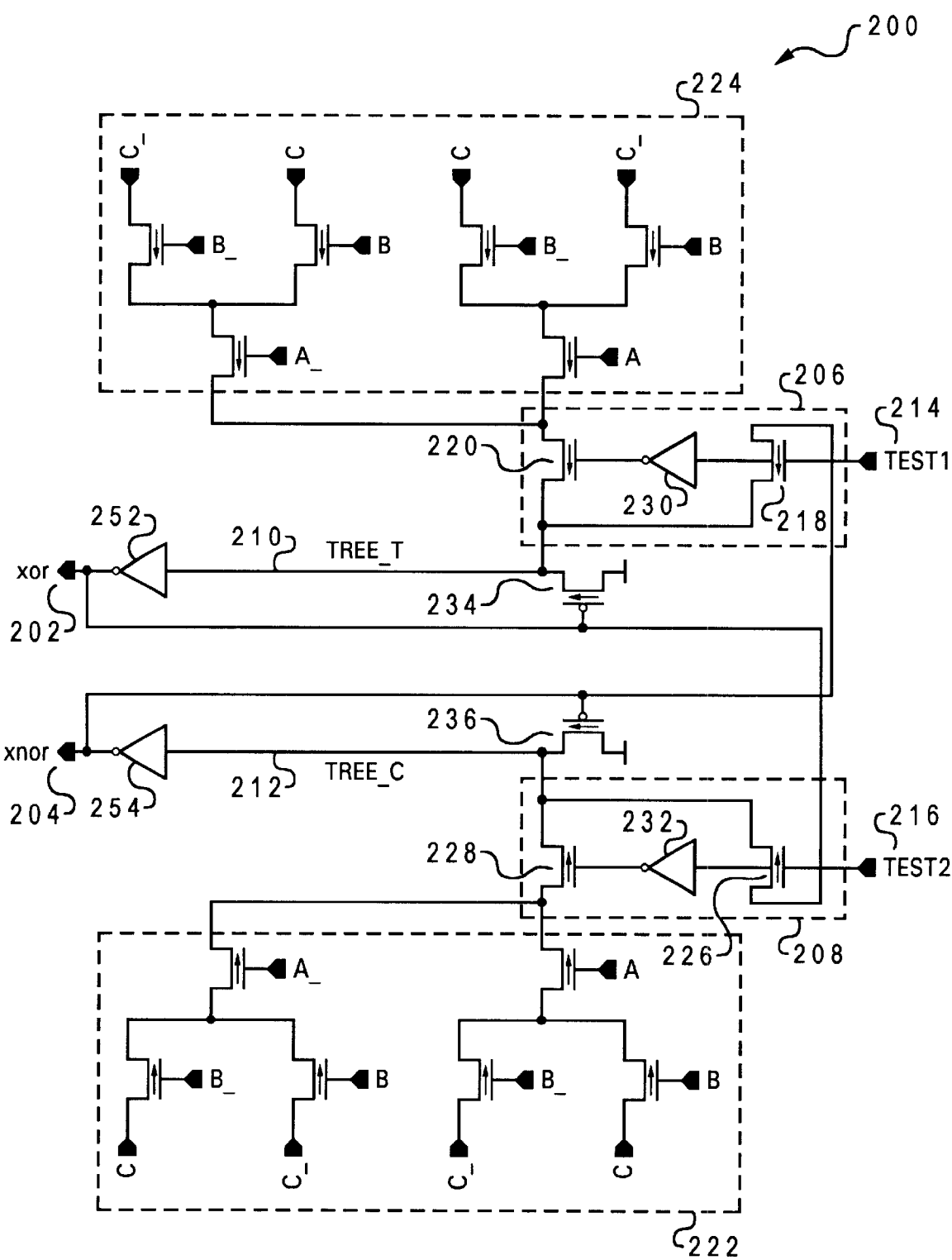
FIG. 2A depicts one embodiment of the system of the present invention in which test signals are utilized to wrap complementary outputs into multiplexing NMOS pass-gate inputs within a standard complementary pass transistor logic circuit.

FIGS. 2A/2B, 3A/3B, 4A/4B and 5A/5B, illustrate four different embodiments of the invention in terms of standard CPL ("A" notations), and. cross-coupled CPL ("B" notations). That is, FIGS. 2A, 3A, 4A, and 5A are embodiments for standard CPL circuits 200, 300, 400, and 500, while 2B, 3B, 4B, and 5B are embodiments for cross-coupled CPL-circuits 250, 350, 450, and 550. The circuits depicted in FIGS. 2A/2B, 3A/3B, 4A/4B and 5A/5B, share many of the same features which, in the interest of clarity, will be numbered consistently throughout. It should be noted that although FIGS. 2A/2B, 3A/3B, 4A/4B and 5A/5B, illustrate implementation of the present invention within CPL circuits, any other variation or family of complementary logic circuits may be similarly modified without departing from the spirit and scope of the present invention.

Figure 2B:
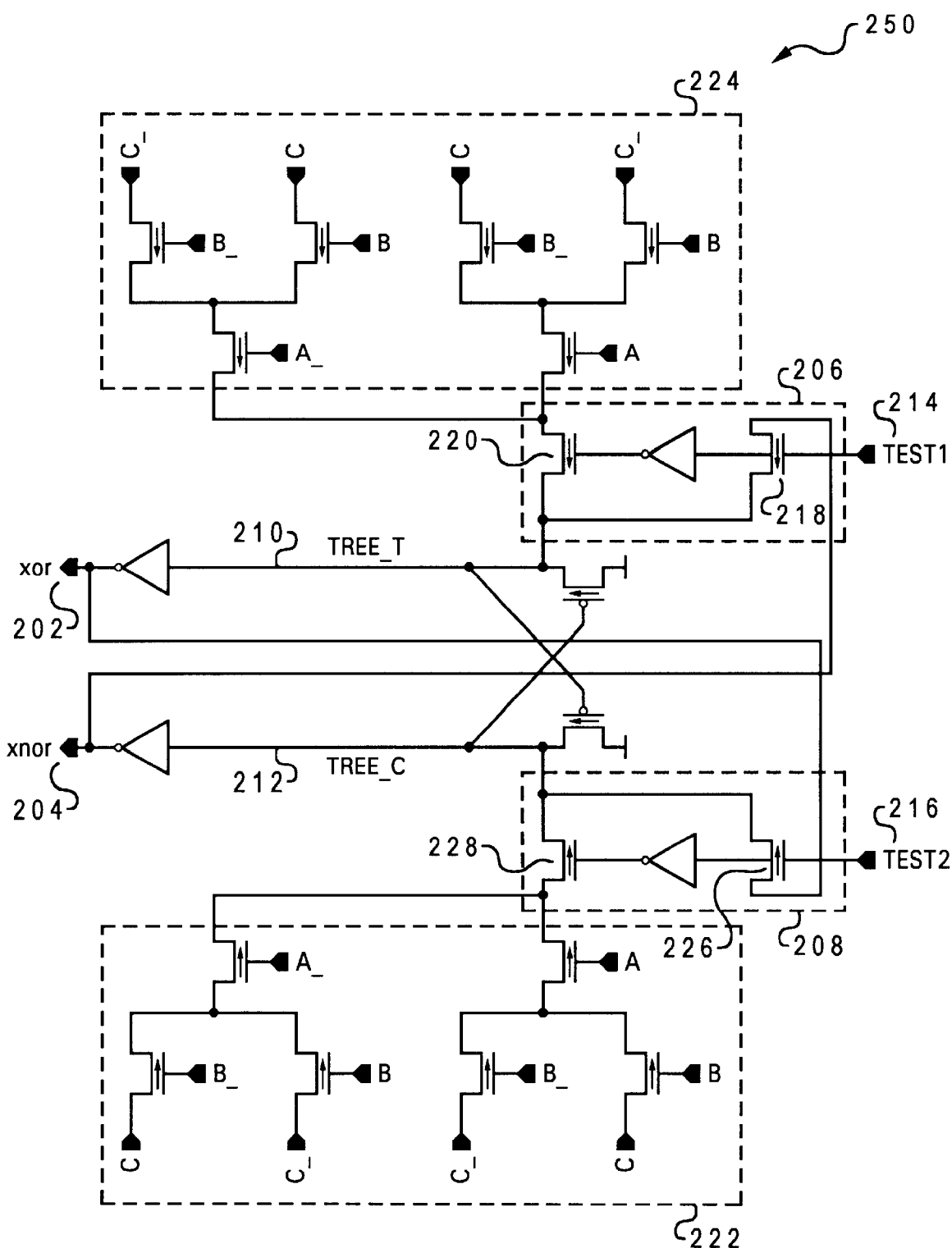
FIG. 2B illustrates the test multiplexing scheme of FIG. 2A applied to a cross-coupled complementary pass transistor logic circuit.

FIGS. 2A and 2B depict one embodiment of the present invention that, in the interest of clarity, will be referred to hereinafter as "Test Mux Type 1a". As seen in FIG. 2A, complementary XOR/XNOR outputs 202 and 204 are wrapped into multiplexing NMOS pass-gates 206 and 208 utilizing select signals TEST1 214 and TEST2 216 respectively.

Figure 3A:
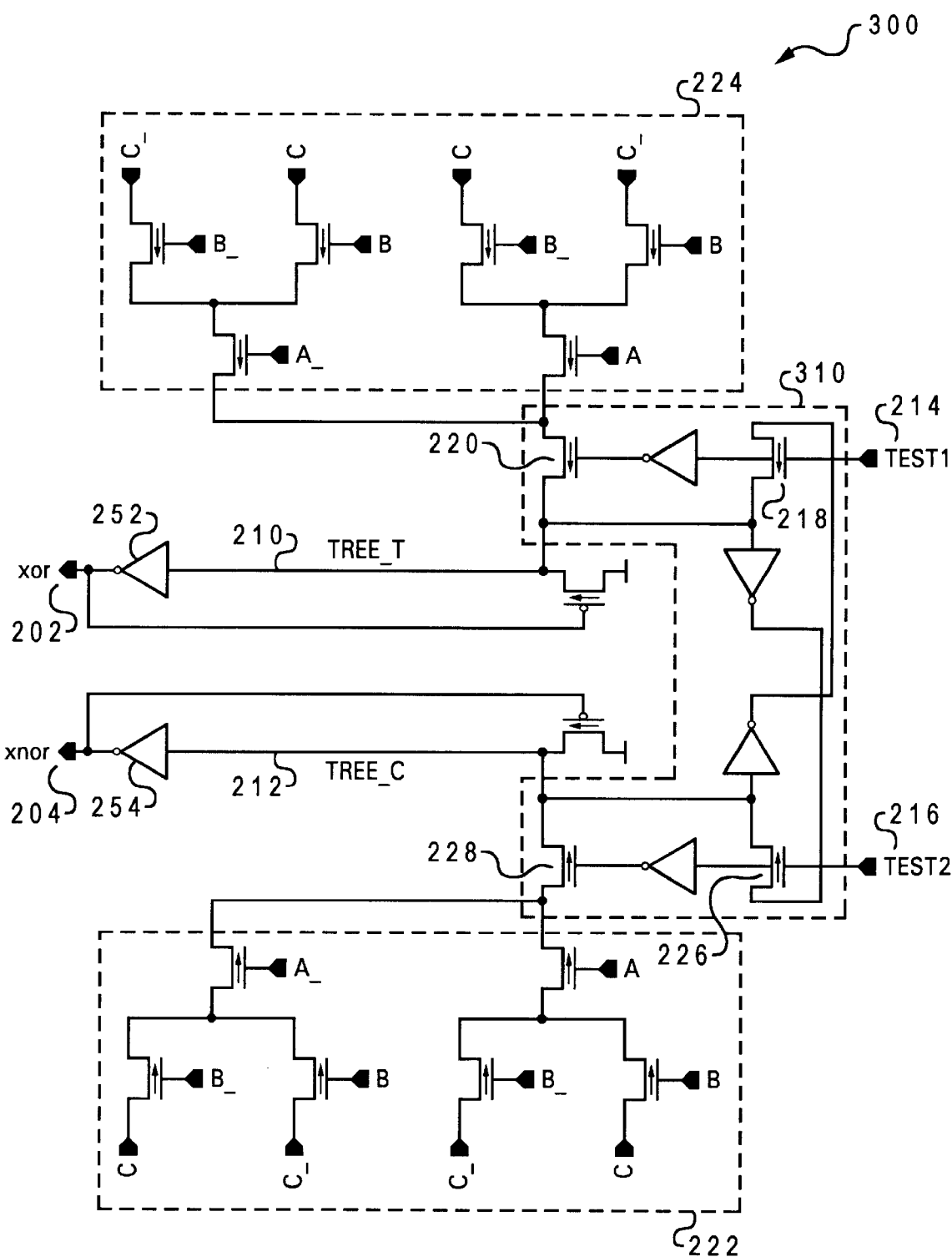
FIG. 3A depicts an alternate embodiment of the present invention in which test signals are utilized to feed internal nodes of a standard complementary pass transistor logic circuit into multiplexing NMOS pass-gate inputs.
Figure 3B:
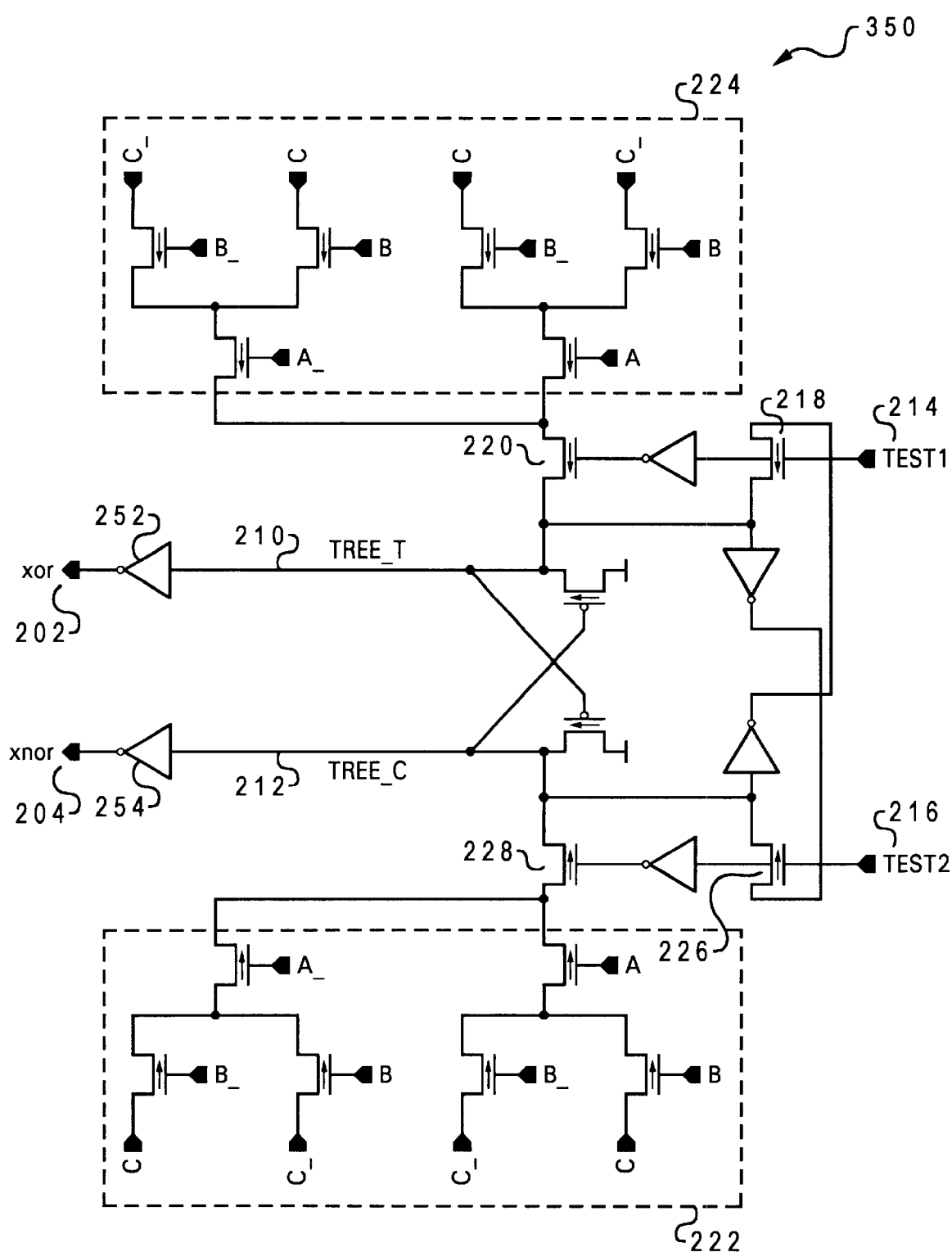
FIG. 3B illustrates the test multiplexing scheme of FIG. 3A applied to a cross-coupled complementary pass transistor logic circuit.

FIGS. 3A and 3B illustrate an alternate embodiment of the present invention referred to hereinafter as "Test Mux Type 1b". In this embodiment, internal nodes TREE_T 210 and TREE_C 212 are fed through inverters into multiplexing NMOS pass-gate inputs utilizing select signals TEST1 214 and TEST2 216.

Figure 4A:
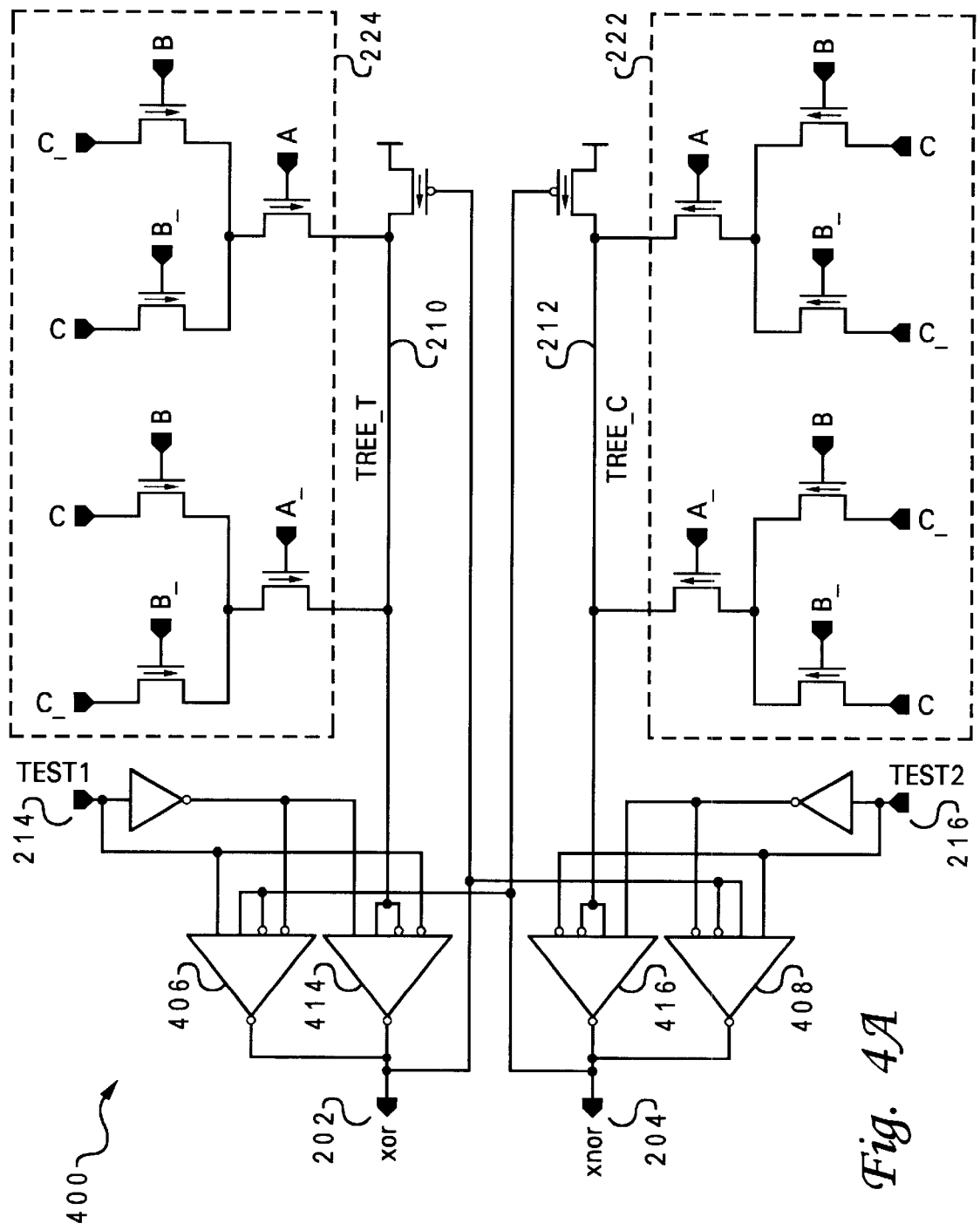
FIG. 4A depicts an alternate embodiment of the present invention in which test signals are utilized to wrap the complementary outputs of a standard complementary pass transistor logic circuit into a set of tristate multiplexing inverters.
Figure 4B:
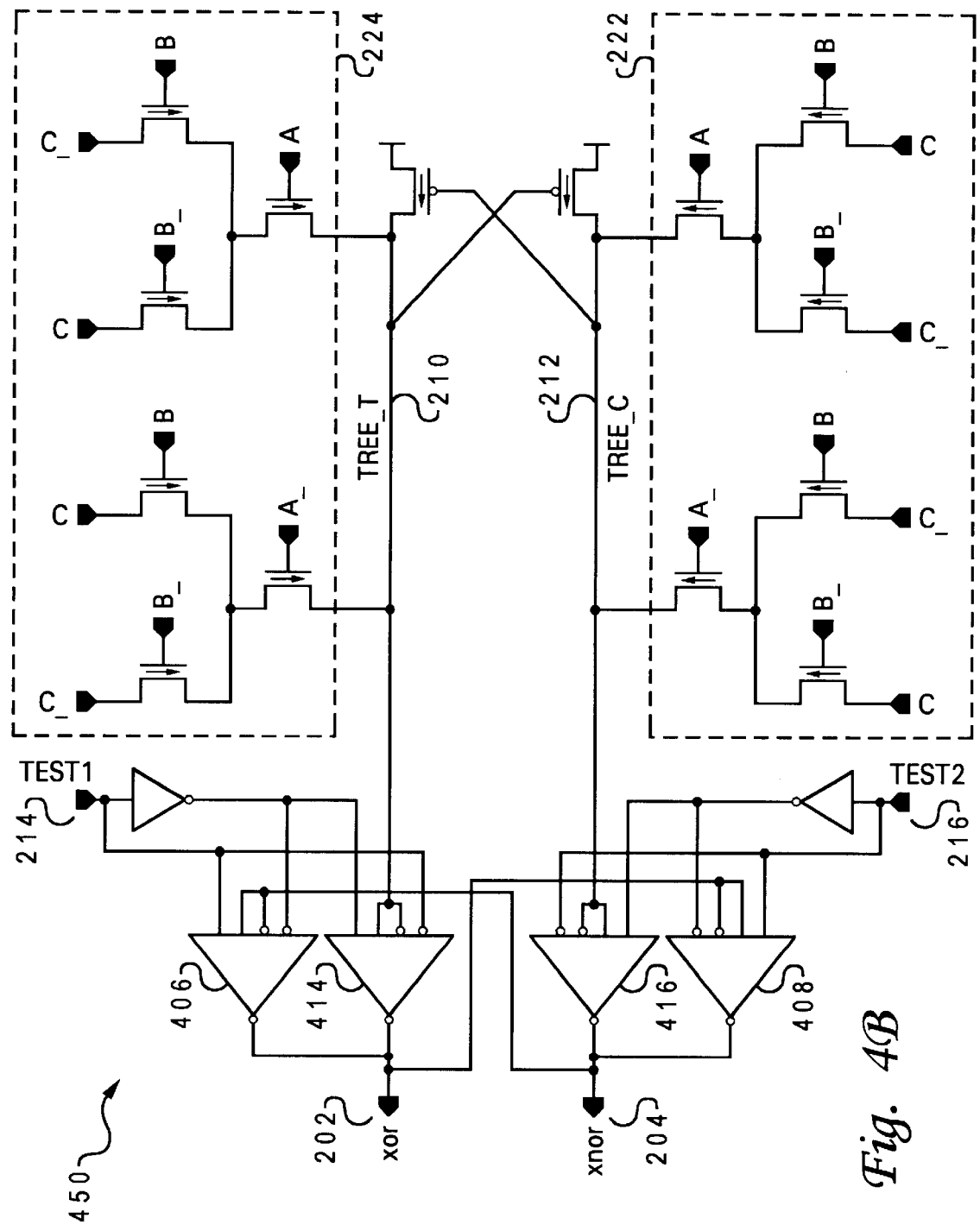
FIG. 4B illustrates the tristate multiplexing scheme of FIG. 4A applied to a cross-coupled complementary pass transistor logic circuit.

FIGS. 4A and 4B depict an alternate embodiment of the present invention referred to hereinafter as "Test Mux Type 2a". In this embodiment, the output inverters 252 and 254, characteristic of CPL circuits illustrated in FIGS. 2A/2B and 3A/3B, are replaced with tristate multiplexing inverters 414 and 416. In parallel, complementary outputs 202 and 204 are wrapped into a second set of tristate multiplexer inverters 406 and 408 utilizing select signals TEST1 214 and TEST2 216.

Figure 5A:
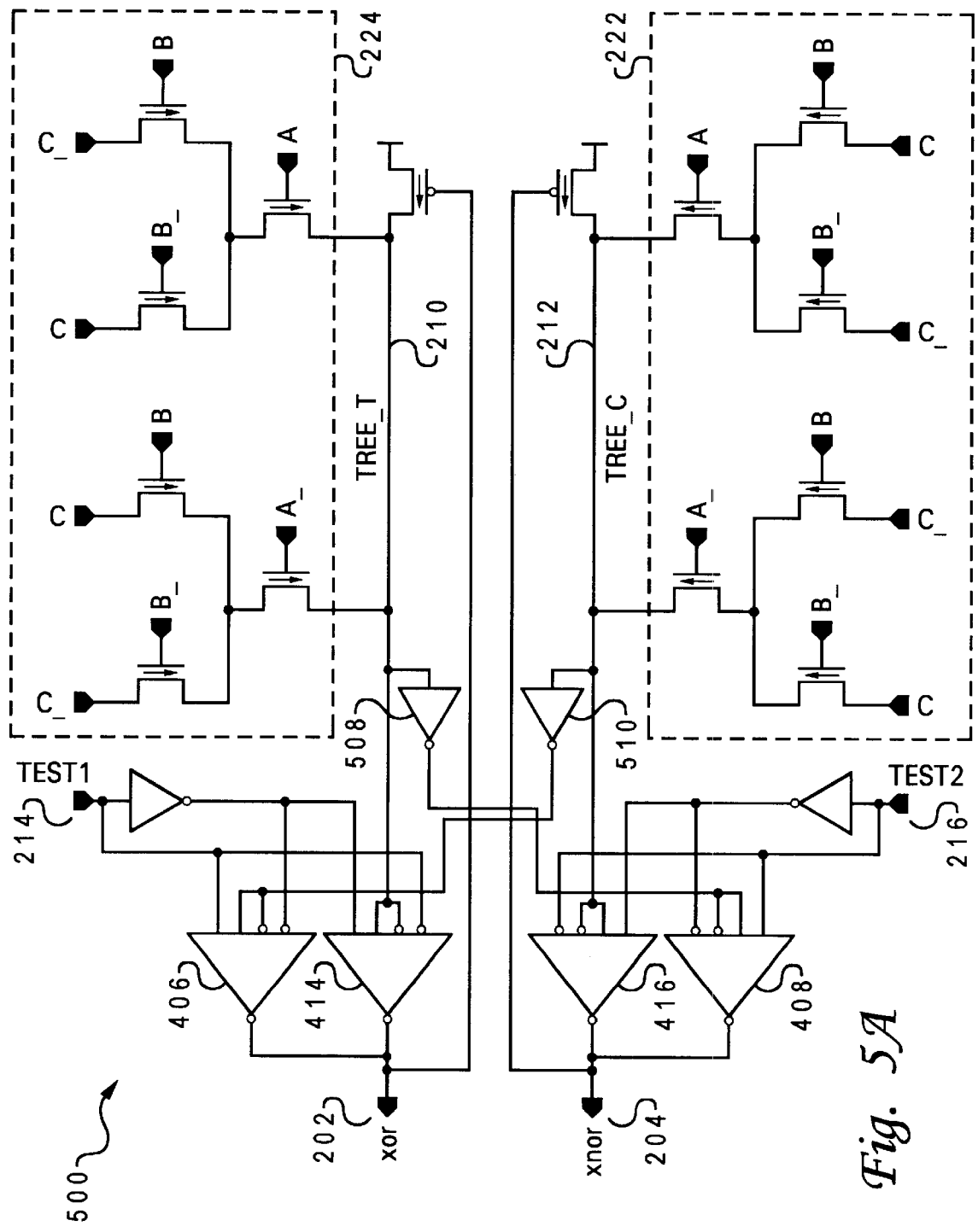
FIG. 5A depicts an alternate embodiment of the present invention in which test signals are utilized to feed internal nodes of a standard complementary pass transistor logic circuit into a set of tristate multiplexing inverters.
Figure 5B:
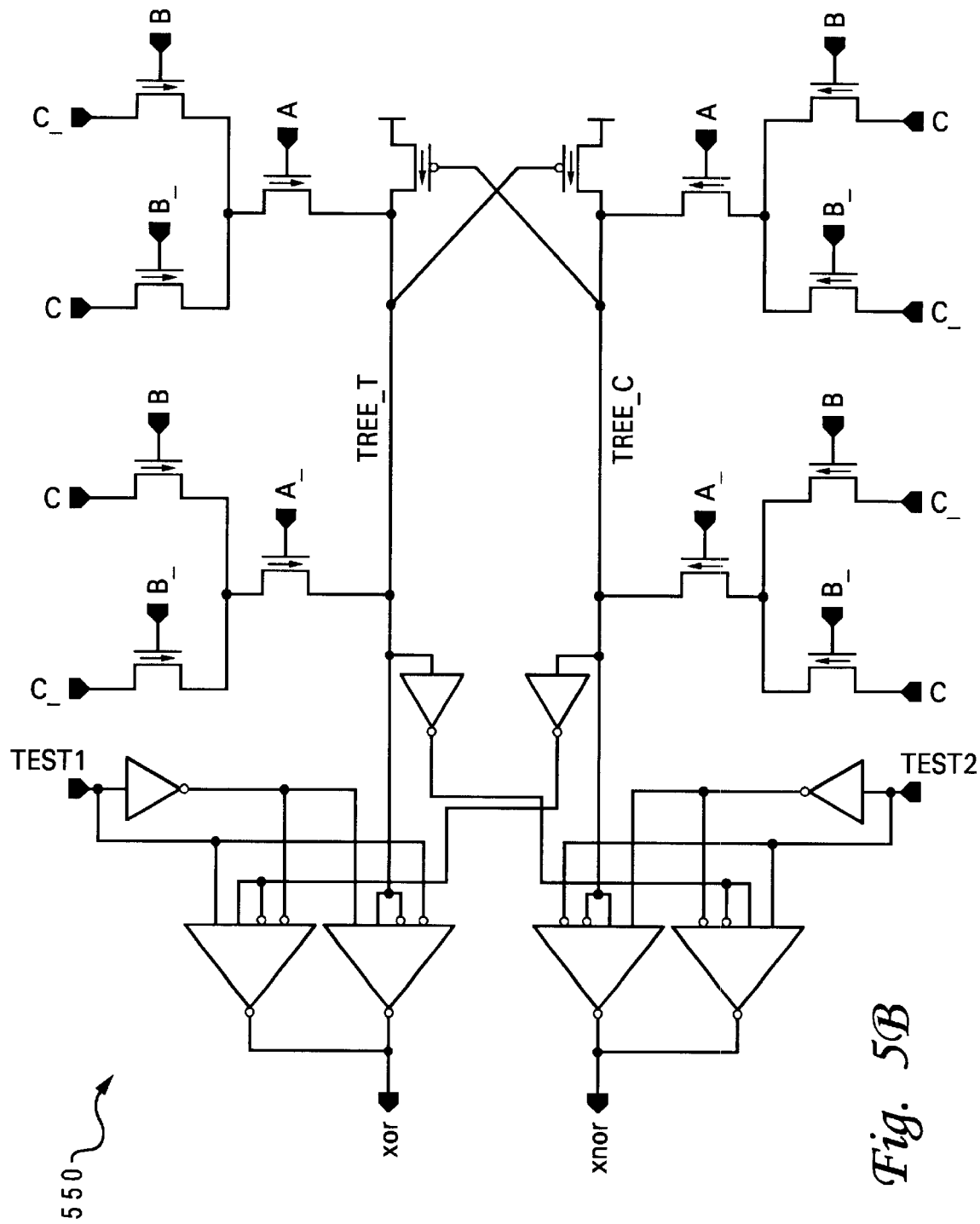
FIG. 5B illustrates the tristate multiplexing scheme of FIG. 5A applied to a cross-coupled complementary pass transistor logic circuit.

FIGS. 5A and 5B illustrate an alternate embodiment of the present invention referred to hereinafter as "Test Mux Type 2b". In this embodiment, the output inverters are again replaced by a pair of tristate multiplexing inverters 414 and 416. In this embodiment, however, internal nodes TREE_T 210 and TREE_C 212 are fed through inverters 508 and 510, and wrapped into a second set of tristate multiplexer inverters 406 and 408 utilizing select signals TEST1 214 and TEST2 216.

Note that in all embodiments, two new test control input signals, TEST1 214 and TEST2 216 have been added, along with multiplexing circuitry on both true and complement circuit outputs or internal nodes. Each of the multiplexing circuits of FIGS. 2A/2B, 3A/3B, 4A/4B and 5A/5B, have varying effects on the circuit size, speed, and power consumption. Depending on circuit design priorities, these or some alternative implementation of the multiplexing functions of this invention would be chosen.

Figure 6:
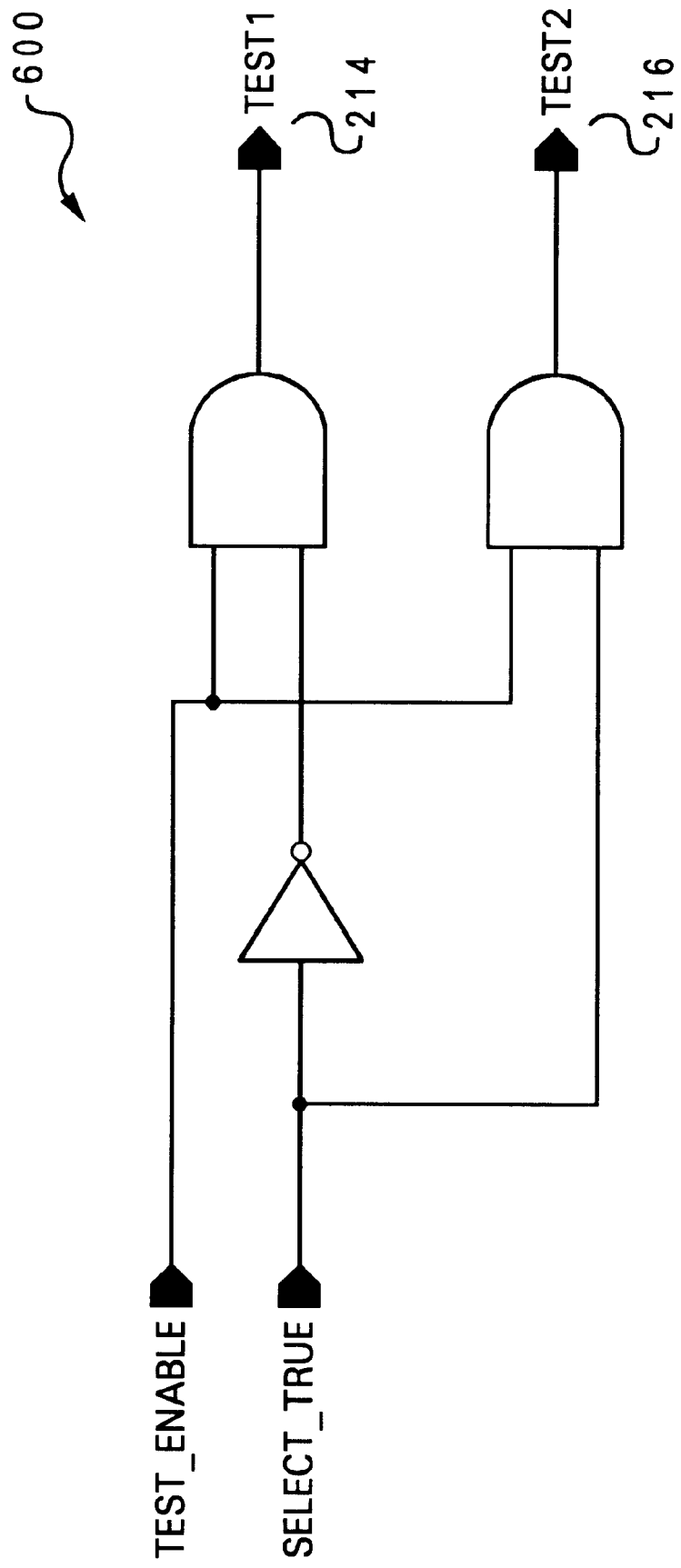
FIG. 6 depicts a test enable circuit configuration for generating test signals that act as select input lines for the multiplexers illustrated in FIGS. 2A, 2B, 3A, 3B, 4A, 4B, 5A, and 5B.

Operation of the circuits of FIGS. 2A/2B, 3A/3B, 4A/4B and 5A/5B, occurs by controlling external TEST1 214 and TEST2 216 input select signals. When inputs TEST1 214 and TEST2 216 are both set to logical 0, the circuits of FIGS. 2A/2B, 3A/3B, 4A/4B and 5A/5B, operate normally, logically identically to the circuit of FIGS. 1A and 1B. Note, however, that if inputs TEST1 214 and TEST2 216 are both set to logical 1, the circuits of FIGS. 2A/2B, 3A/3B, 4A/4B and 5A/5B, would be rendered non-functional. Thus, this state of signals TEST1 214 and TEST2 216 is never utilized during diagnostic testing or other circuit use. Consequently, FIG. 6 illustrates an example test enable circuit 600 that may be utilized to generate TEST1 214 and TEST2 216 without allowing both to be set to logical 1 simultaneously.

To illustrate an exemplary test mode of operation in accordance with the teachings of the present invention, consider CPL circuit 200 of FIG. 2A. When input TEST1 214 is set to a logical 1 and TEST2 216 is simultaneously set to a logical 0, "XOR" output 202 receives its value from "XNOR" output 204 via nmos pass-transistor 218 instead of from a standard true side nmos pass-transistor 220. Note that if there is a defect in complement transistor tree 222, both "XOR" output 202 and "XNOR" output 204 will produce incorrect values. Also, note that if there is a defect only in true transistor tree 224, both "XOR" output 202 and "XNOR" output 204 will produce correct values.

Similarly, when input TEST1 214 is set to a logical 0 and TEST2 216 is set to a logical 1, "XNOR" output 204 receives its value from "XOR" output 202 via nmos pass-transistor 226 instead of from a standard complement side nmos pass-transistor 228. Note that if there is a defect in true transistor tree 224, both "XOR" output 202 and "XNOR" output 204 will produce incorrect values. Also, note that if there is a defect only in complement transistor tree 222, both "XOR" output 202 and "XNOR" output 204 will produce correct values.

All the other embodiments of the present invention depicted in FIGS. 3A/3B, 4A/4B and 5A/5B, operate in a similar fashion.

On a chip-wide basis, test select signals, such as TEST1 214 and TEST2 216, that are supplied to each complementary logic circuit may be generated and distributed to individual sub-circuits in a variety of ways, depending on the objectives of a particular design implementation.

For example, if a primary objective is to ensure the ability to detect defects that cause errors in either true or complement transistor trees, these test select signals may be generated from a single external source and distributed as a global test signal applied uniformly to all complementary logic circuits. This diagnostic method would allow detecting and discarding any die with defects in either true or complement logic trees. In the alternative, this method would allow repairing single or multiple defects that affect only true transistor trees or only complement transistor trees.

On the other hand, if the objective is to significantly improve manufacturing yield or to significantly enhance system error correction, separate TEST1 and TEST2 select signals may be generated for each circuit, macro, or unit, depending on the degree of repairability desired. In this way, multiple defects that occur in only one logic tree within the domain of an individually generated and distributed pair of test select signals, but that may affect both true and complement logic trees, may be detected and corrected.

Figure 1A:
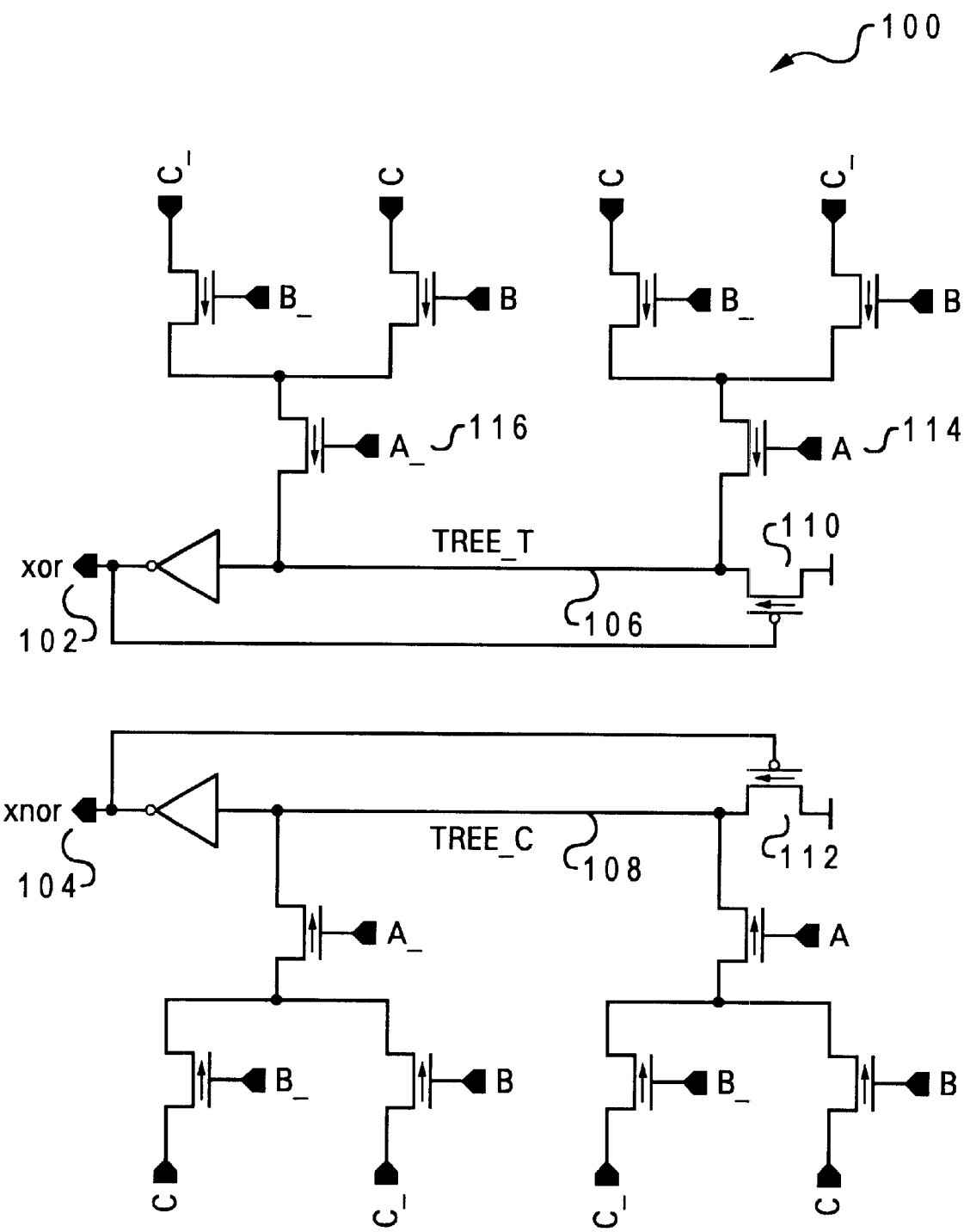
FIG. 1A is an electrical diagram of a prior art three-way XOR/XNOR standard complementary pass transistor logic circuit.
Figure 1B:
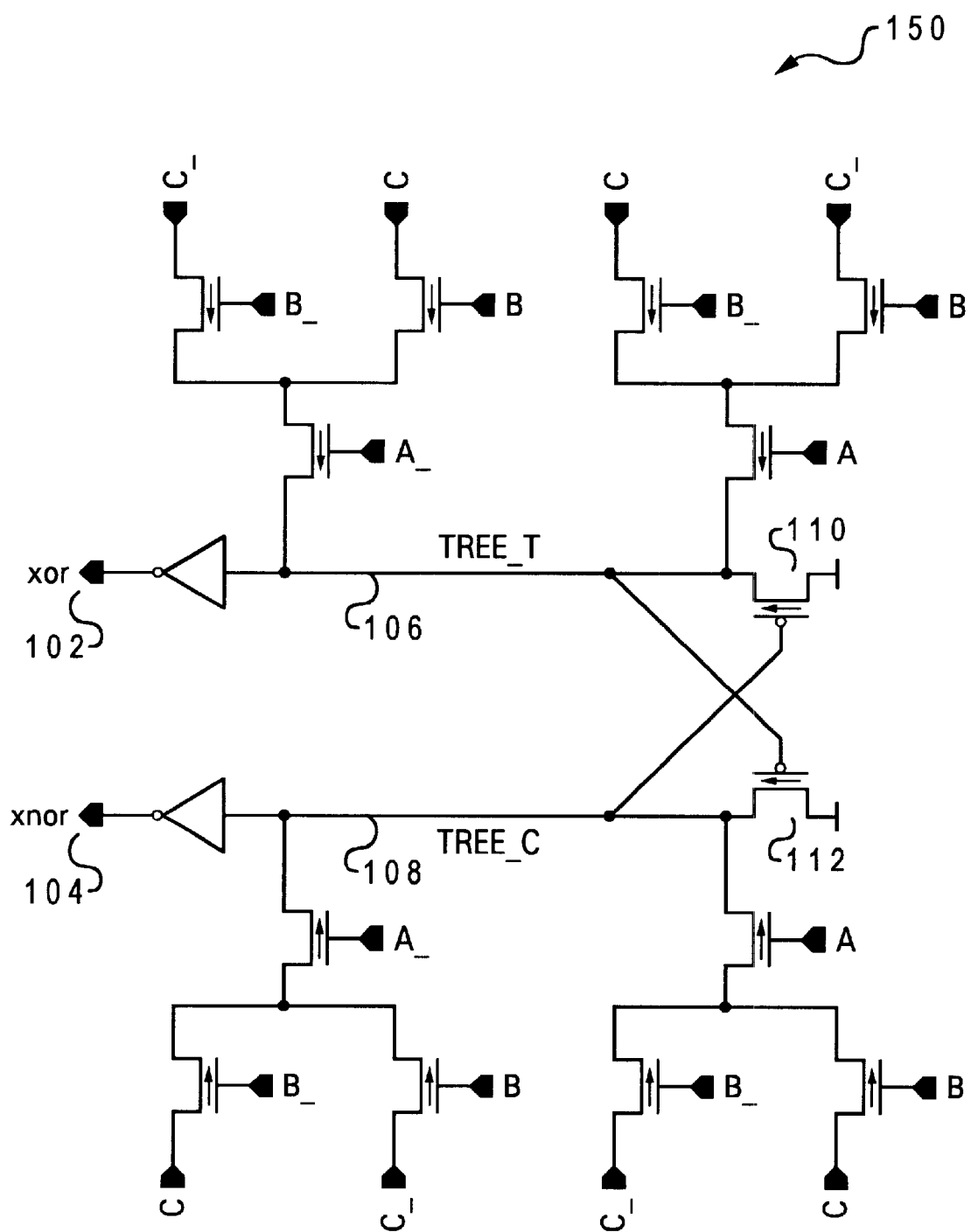
FIG. 1B is an electrical diagram of a prior art three-way XOR/XNOR cross-coupled complementary pass transistor logic circuit.
Figure 7:
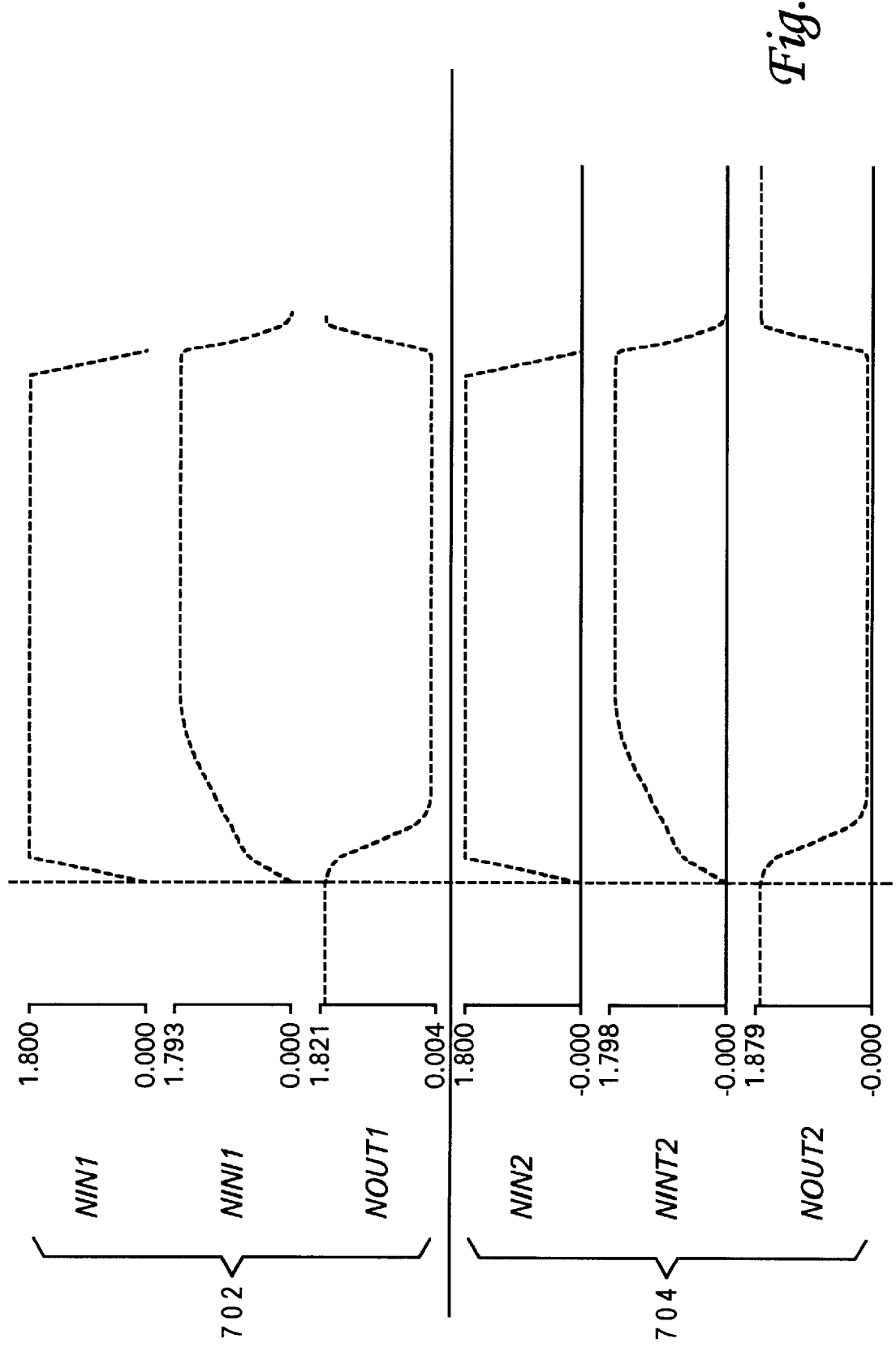
FIG. 7 is a graphical representation of the output voltage as a function of time for FIGS. 1B and 2B, illustrating the effect on circuit performance caused by implementation of the system and method of the present invention on a cross-coupled complementary pass transistor logic circuit.

The insertion of the multiplexing functions illustrated in FIGS. 2A/2B, 3A/3B, 4A/4B and 5A/5B, into the functional paths of FIGS. 1A/1B may have an impact on overall circuit performance. For example, by inserting nmos device 220 of FIGS. 2A/2B and 3A/3B into the functional path of CPL circuits 100 and 150 depicted in FIGS. 1A and 1B, the circuit performance may be reduced because the height of the evaluation stack is increased by 1. To illustrate this degradation, consider the simulation results illustrated in FIG. 7. As seen in FIG. 7, signal set 702 corresponds to an output response of cross-coupled CPL circuit 150 of FIG. 1B. Signal set 704 corresponds to an output response of modified cross-coupled CPL circuit 250 of FIG. 2B. A comparison of simulation results illustrated in signal sets 702 and 704, demonstrate that the insertion of nmos device 220 results in the following performance degradation in terms of delay: C rising to OUT (XOR) falling: 22 ps out of 126 ps, or 17%; and, C falling to OUT (XOR) rising: 9 ps out of 105 ps, or 8.5%. The average of both results in a penalty of less than 13%.

It should be noted that the multiplexing schemes illustrated in FIGS. 4A/4B and 5A/5B will have a slightly lower performance impact than those depicted in FIGS. 2A/2B and 3A/3B. That is, instead of inserting an additional nmos pass-device into the evaluation stack, an extra device set (nmos and pmos) to the supply rails (GND and VDD) has been added in the output inverter to create a tristate mux/inverter. Simulation results demonstrate that a penalty of approximately 10% will result.

However, in terms of area, the cost of the test controlling circuitry may optionally be minimized. That is, for the embodiment illustrated in FIG. 2A/2B (Test Mux Type 1a), the addition of inverters 230 and 232 and nmos devices 220, 228, 218, and 226 the additional die area required is quite small: inverters 230/232 are of minimum feature size as they are non-functional; nmos devices 220 and 228 are the same size as the regular evaluation nmos devices within true tree 224 and complement tree 222; nmos devices 218 and 226 are only of sufficient size (typically small) to provide a DC-solution pull-down of the internal nodes TREE_T 210 and TREE_C 212, while pulling against (weak) pmos devices 234 and 236.

As described in FIGS. 2A/2B, 3A/3B, 4A/4B and 5A/5B, complementary logic circuits are modified by adding a multiplexing function into the evaluation tree or on the output of the circuits themselves. It should be noted that the example embodiments depicted in FIGS. 2A/2B, 3A/3B, 4A/4B and 5A/5B, are not an exhaustive list of all possible embodiments of the system and method described herein.

As described in FIGS. 2A/2B, 3A/3B, 4A/4B and 5A/5B, the multiplexing error correction system operates as follows. In standard operating mode, test select signals TEST1 214 and TEST2 216 are held low, permitting the true/complement outputs to operate normally. Thus, complementary logical evaluation NFET trees (true transistor tree 224 and complement transistor tree 222) generate complementary outputs.

In test mode, either TEST1 214 or TEST2 216 is asserted high while the other remains low. This permits one of the complementary outputs to multiplex in the other. For example, if TEST1 214 is high while TEST2 216 is low, "XNOR" output 204 will be utilized to generate "XOR" output 202 via NFET transistor 218 and a subsequent inverter 230.

Although the modified CPL circuits of FIGS. 2A/2B, 3A/3B, 4A/4B and 5A/5B, may be utilized as diagnostic aids during chip testing, they have some limitations. First, forcing all true outputs to generate complement (or vice-versa) on a chip may not achieve the desired effect. That is, if a fault occurred in the true portion of one circuit and the complement portion of another, then a chip-wide replacement would not repair the design: if TEST1 214 was asserted, then the faulty complement transistor tree 222 would be utilized to generate the "XOR" output 202; if TEST2 216 was asserted, then the faulty true transistor tree 224 would be utilized to generate "XNOR" output 204. Either way, one output would still be in error.

Turning to FIGS. 8 through 11, a system and method for implementing an improved "on-the-fly" repair operation will now be described. That is, test select signals TEST1 214 and TEST2 216 will not be asserted externally on a chip-wide basis. Instead, the present invention provides a system and method for automatically asserting test select signals as needed in response to detection of a non-complementary output during runtime circuit operation.

The runtime detection and repair circuit of the present invention may be utilized on a critical path basis. A critical path may be compromised of multiple complementary logic circuits depicted in FIGS. 2A/2B, 3A/3B, 4A/4B and 5A/5B. The addition to the CPL circuitry depicted in FIGS. 2A/2B, 3A/3B, 4A/4B and 5A/5B, will increase the delay only slightly in a normal operational mode, and is tolerable within the overall chip cycle time under non-repaired operation. If either TEST1 214 or TEST2 216 is asserted, then an additional delay time penalty must be assessed to generate the opposite logical output. Thus, if the TEST1/TEST2 signal is asserted on a chip-wide basis, the delay impact on the critical path would be equal to the delay impact of each complementary logic stage times the number of stages in the path. The delay caused by such an externally generated chip-wide correction feature may be unacceptable under circumstances other than diagnostic testing.

Therefore, the modifications to CPL circuits illustrated in FIGS. 8 through 11 control the multiplexing repair function on a per-circuit or criticak path basis if a non-complementary condition occurs. Therefore, each individual circuit will only be repaired (multiplexed) if an actual error in that circuit or group of circuits is detected. Furthermore, the delay of a path that contains such a repaired circuit will only be assessed a delay penalty equal to the number of stages that are actually repaired, which is typically much less than the total number of stages in a critical path. Furthermore, global test select lines are now unnecessary, with test select lines such as TEST1 214 and TEST2 216 now being controlled locally by each circuit.

Figure 8:
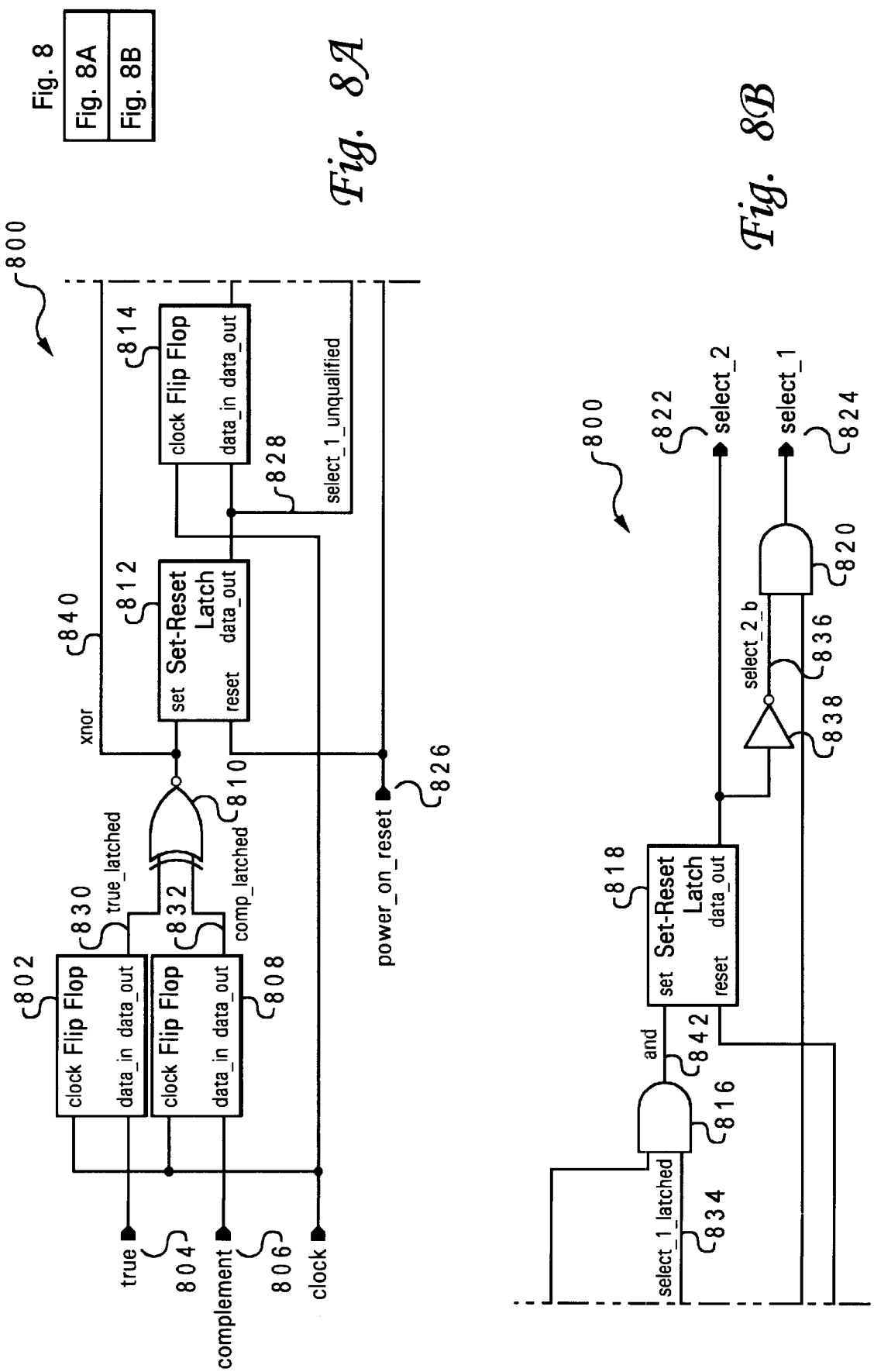
FIG. 8 illustrates a schematic representation of a self-repair circuit in accordance with a preferred embodiment of the present invention.

To accomplish the self error repair operation, a self-repair error control circuit 800 of FIG. 8 is added to the output of each complementary logic circuit (as in FIGS. 2A/2B, 3A/3B, 4A/4B and 5A/5B,). Self-repair error control circuit 800 will continually monitor the output results of a complementary logic circuit and automatically perform any needed repair operation by controlling the assertion of select test signals TEST1 214 and TEST2 216 as illustrated in self-repair system 900 of FIG. 9.

Self-repair error control circuit 800 of FIG. 8 operates as follows. When an integrated circuit chip on which complementary circuitry resides is activated, reset signal 826 is asserted/pulsed by other circuitry. This reset feature is widely known and utilized in the industry to initialize VLSI chips and is incorporated herein by reference. Setting reset signal 826 high forces outputs of a pair of set-reset latches 812 and 818 low. This results in "select_1_unqualified" signal 828 and "select_2" signal 822 being forced low.

Additionally, other on-chip circuitry connected to the "power_on_reset" controlling circuitry (not shown) initialize flip-flops 802, 808, and 814 to force their outputs "true_latched" 830 and "comp_latched" 832, and "select_1_latched" 834 respectively, to zero. The details regarding how to implement this feature is also widely known and utilized in industry to provide a proper initialization point for chip operation and is incorporated herein by reference.

Signal "select_2_b" 836 is now high via inverter 838, as "select_2" 822 is low. Signal "select_1" 824 is low due to "select_1_unqualified" 828 being low in conjunction with "select_2_b" 836 being high.

Initially, at the end of each cycle (clock boundary), the values of "true" and "complement" are stored in flip-flops 802 and 808, providing outputs "true_latched" 830 and "comp_latched" 832. Additionally, the last state of set-reset latch 812 is stored in flip-flop 814, thus providing output "select_1_latched" 834.

At the start of the next cycle, XNOR gate 810 compares "true_latched" 830 and "comp_latched" 832 to produce signal "XNOR" 840. Note that signal "XNOR" 840 will be a logical 0 if signals 830 and 832 differ (0/1 or 1/0), but a logical 1 if they are the same (0/0 or 1/1). If "XNOR" 840 is a logical 1, then set-reset latch 812 sets, causing output "select_1_unqualified" 828 to be a 1. Because "select_1_latched" 834 is at the previous state of "select_1_unqualified" 828 (a logical 0), the output of AND gate 816 is a 0, resulting in the "set" line of set-reset latch 818 not being asserted. This keeps "select_2" 822 at a 0.

"Select_2" 822 being low results in "select_2_b" 836 being forced high via inverter 838. Output "select_1" 824 is now a logical 1 because "select_2_b" 836 is a 1 and "select_1_unqualified" 828 is a 1. This condition signifies that a first non-complementary logical pair (an error) on the inputs "true" 804 and "complement" 806, has been detected.

After the initial operation, the sampling of inputs "true" 804 and "complement" 806 continues. At each subsequent cycle, flip-flop 814 stores the previous state of the set-reset latch 812. Note that if latch 812 is ever set (by "XNOR" 840 at a logical 1) its value will remain at 1 until reset by the "power_on_reset" signal 826.

If a subsequent non-complementary condition occurs on "true" input 804 and "complement" input 806, signal "XNOR" 840 will return to a value of 1. Output signal "and" 842 from AND gate 816 will now be asserted to a 1 because "select_1_latched" 834 and "XNOR" 840 are both 1. Signal "and" 842 at a 1, sets set-reset latch 818, causing output "select_2" 822 to be a 1. When "select_2" 822 is a 1, "select_2_b" 836 is a 0 via inverter 838. When "select_2_b" 836 is a 0, output "select_1" 824 is forced low, even though "select_1unqualified" 828 is a 1. The setting of "select_2" to 1 signifies that a second non-complementary logical pair (an error) on the inputs "true" 804 and "complement" 806, has been detected.

Figure 9:
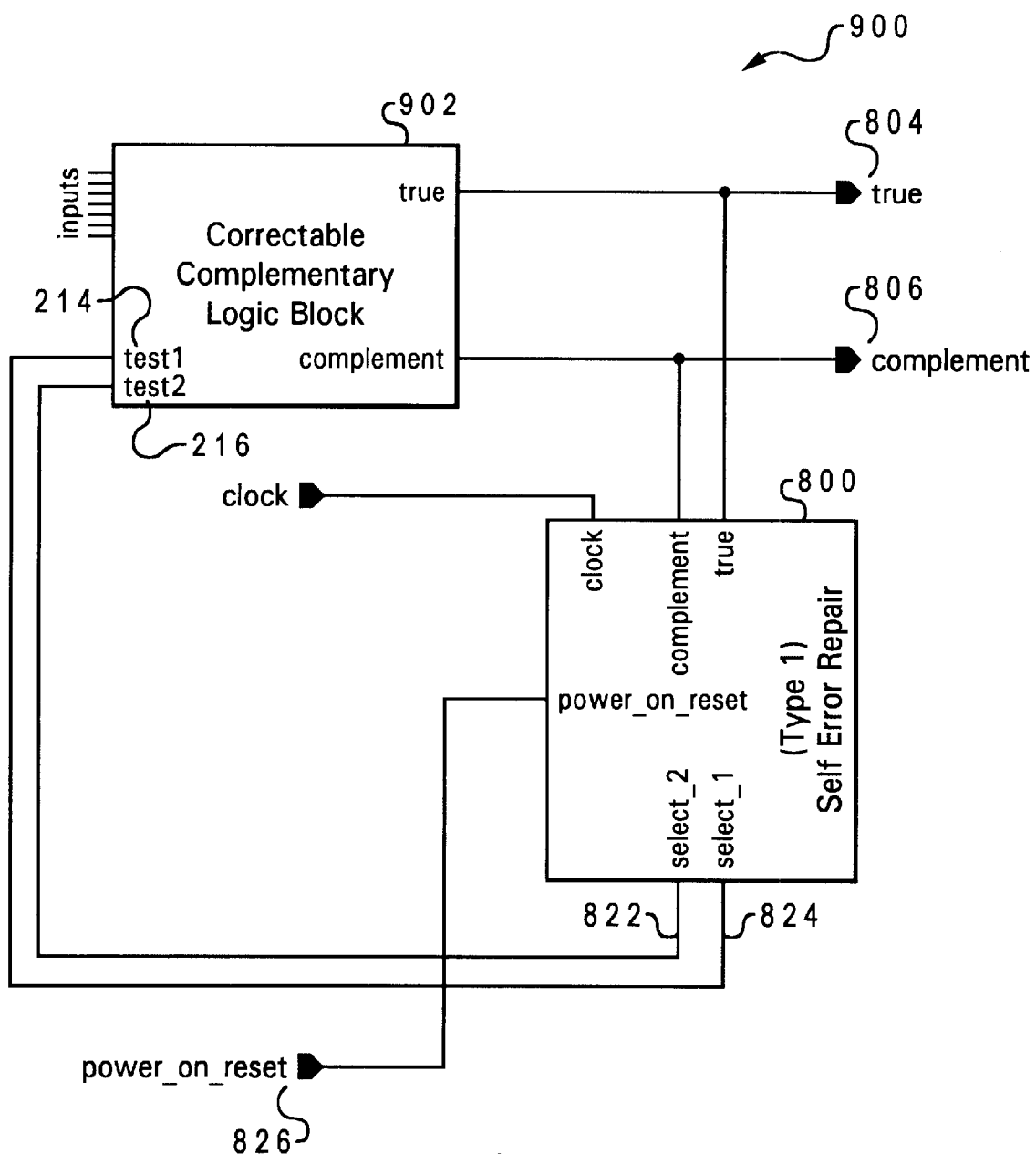
FIG. 9 depicts a system diagram of a self-repair system in accordance with the teachings of the present invention.

When utilized as a self-repairing system, as illustrated in FIG. 9, the outputs "select_1" 824 and "select_2" 822 of self-repair control circuit 800, are coupled to a correctable complementary logic block 902 which, in the example illustrated, may be a combination of one or more of the modified CPL circuits depicted in FIGS. 2 through 5.

Self-repair system 900 of FIG. 9 operates as follows. When a first error (in the form of a proscribed non-complementary condition) is detected by self-repair control circuit 800, correctable complementary logic block 902 utilizes a complement tree to generate "true" output 804. Note that this will result in TEST1 214 being asserted while TEST2 216 remains low.

If a second non-complementary condition is detected by self-repair control circuit 800, the repair is assumed to have been unsuccessful. In this case, TEST2 216 will be asserted and TEST1 214 de-asserted, causing "complement" output 806 to be generated using the true tree within complementary logic block 902. In this way, a entire repair operation occurs in two attempts. That is, if the first repair is somehow unsuccessful, a second repair is automatically attempted.

Figure 10:
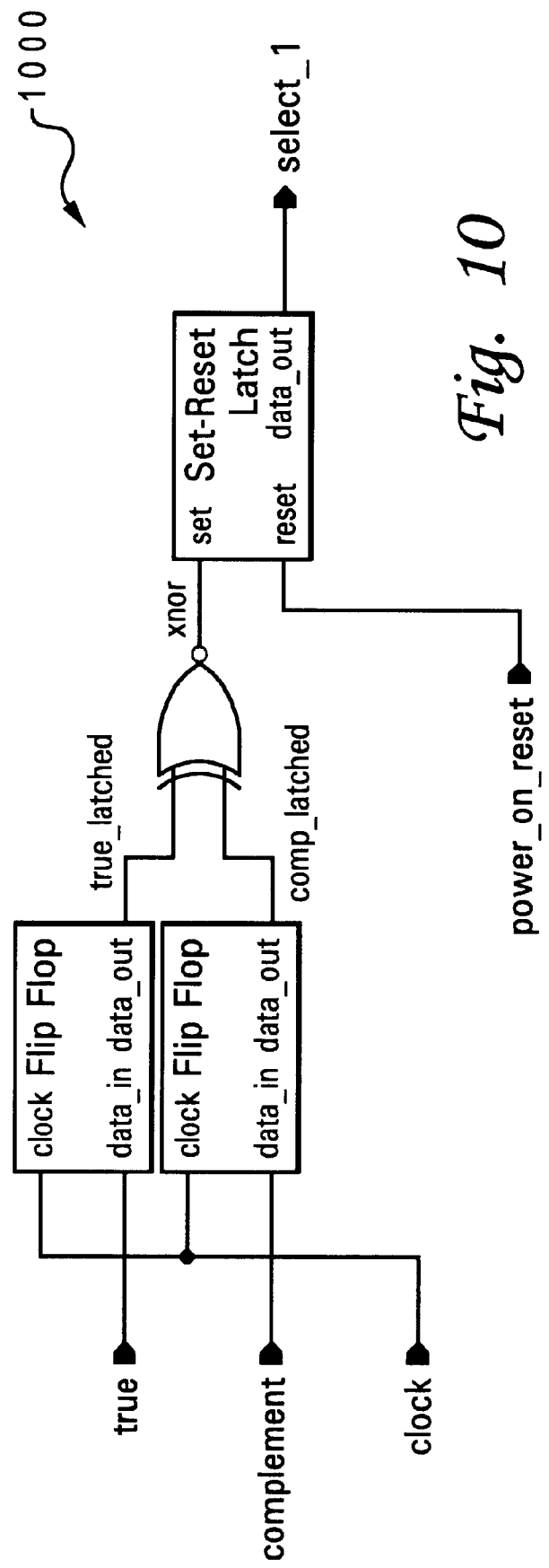
FIG. 10 illustrates a simplified schematic representation of a reduced self-repair control circuit.
Figure 11:
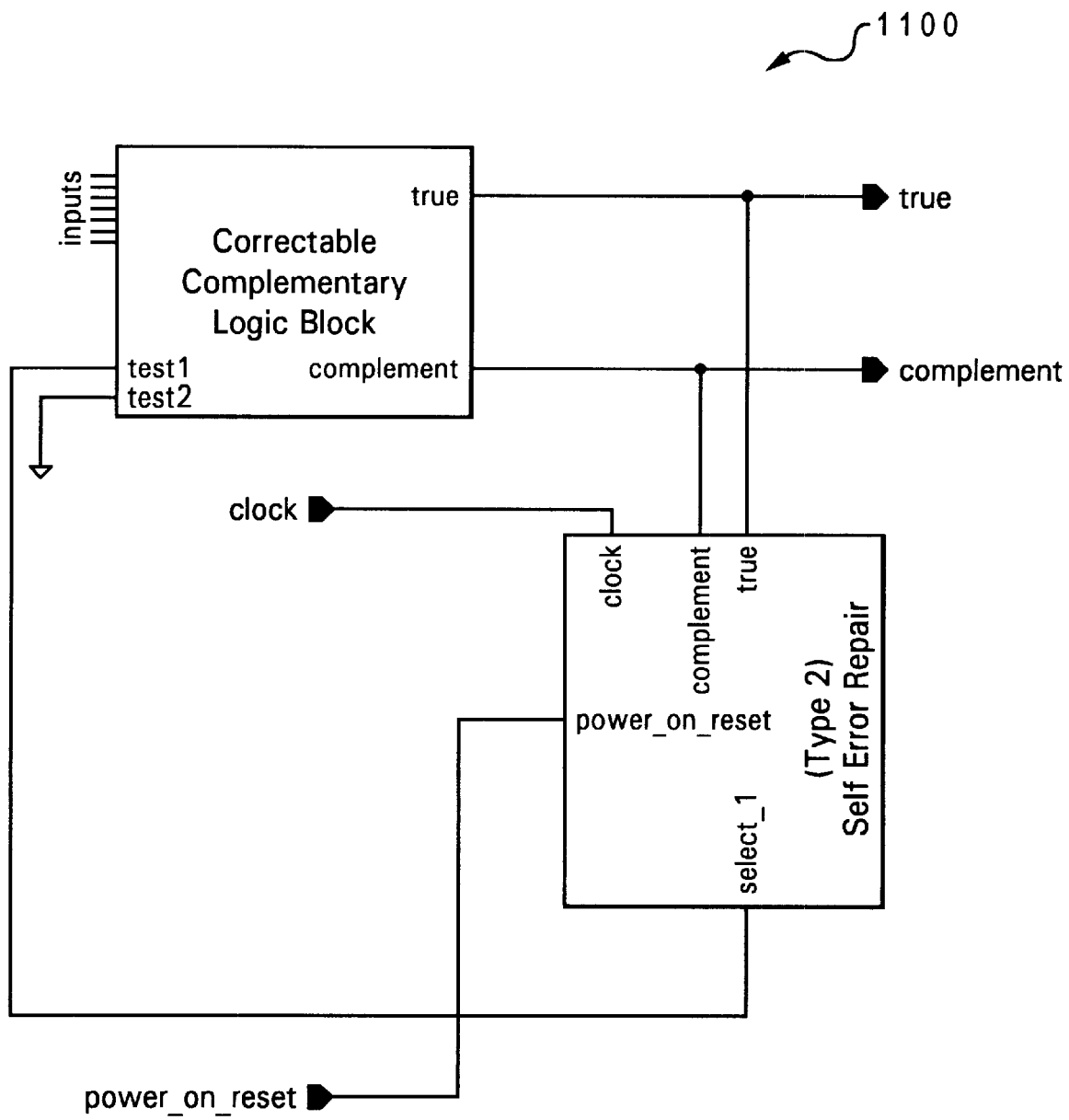
FIG. 11 depicts a system diagram of a reduced self-repair system.

It could be argued that the second "repair attempt" may often be unnecessary because of the nature of the circuitry. This is due to the fact that if the true output fails and a repair is performed to utilize the complement to generate it, then the only further failure mechanism that can occur is in the repairing circuitry inside the complementary logic itself. In the example modified CPL circuit of FIG. 2, for example, such a failure would have to occur in transistor 218 or its subsequent inverter 230. Therefore, self-repair control circuit 800 may be modified into a reduced self-repair circuit 1000, that is much simpler and smaller. As illustrated in FIG. 10, reduced self-repair circuit 1000 is simply the left portion of self-repair control circuit 800 of FIG. 8. A system diagram 1100, corresponding to self-repair system 900 is depicted in FIG. 11.

It should be further pointed out that not all the variations of the self error repair circuitry shown in the aforementioned figures/descriptions have been mentioned. For example, one simple modification would be to move the latches storing the "true" and "complement" information after the XNOR gate, thus latching only the "xnor" signal. Although slightly smaller (by having one less flip-flop circuit) this variation may be hazardous as the cycle time must be able to accommodate the additional evaluation of the XNOR gate before the storage of the output in the flip-flop.

A point must be made to utilize and extent of this technique. The self error repair technique described here can be utilized either sparingly or widespread on a chip basis. That is, the repairing can be done on each individual circuit, a group of circuits, or all the circuits together. The application can occur only in those places where timing permits a slight slow-down of the logical evaluation due to the increased delay of repaired circuit.

Furthermore, it must also be pointed out that just because a chip has repaired itself and that repair operation forces a slightly slower clock frequency, that the chip is definitely not scrap. That is, a slightly slower chip can be sold using sorting techniques. Thus the self repair operation is useful to increase yield in several ways.

While the invention has been particularly shown and described with reference to a preferred embodiment, it will be understood by those skilled in the art that various changes in form and detail may be made therein without departing from the spirit and scope of the invention.

What is claimed is:

1. A system for detecting and rectifying a proscribed non-complementary output from a complementary logic circuit, said system comprising:

a complementary logic circuit having a true tree and a complement tree, said true tree producing a true signal utilized to generate a true output signal from said complementary logic circuit, said complement tree producing a complement signal utilized to generate a complement output signal from said complementary logic circuit;

logic means coupled to the output of said complementary logic circuit for detecting an occurrence of a non-complementary output from said complementary logic circuit; and multiplexing means within said true tree for selectively replacing said true signal with said complement signal within said true tree in response to detection by said logic means of a non-complementary output, such that a non-complementary output is seamlessly detected and rectified.

2. The system of claim 1 wherein said complementary logic circuit is a CMOS configuration.

3. The system of claim 2 wherein said CMOS configuration may be characterized as among a group consisting of: complementary pass transistor logic, double pass transistor logic, and differential cascode voltage switch with pass gate.

4. The system of claim 2 wherein said CMOS configuration is a standard complementary pass transistor logic configuration.

5. The system of claim 2 wherein said CMOS configuration is a cross-coupled complementary pass transistor logic configuration.

6. The system of claim 2 wherein said true tree and said complement tree are comprised of n N-type pass MOSFETs, where n is a number greater or equal to one.

7. The system of claim 1 wherein said complementary logic circuit is constructed utilizing silicon on insulator technology.

8. The system of claim 1 further comprising multiplexing means within said complement tree for selectively replacing said complement signal with said true signal within said complement tree, such that said true tree may be utilized to rectify a non-complementary logic condition at the output of said complementary logic circuit.

9. The system of claim 8 wherein said multiplexing means includes a true input select signal and a complement input select signal.

10. The system of claim 9 wherein said true input select signal is utilized for selectively replacing said true signal with said complement signal and wherein said complement input select signal is utilized for selectively replacing said complement signal with said true signal.

11. The system of claim 10 where in said multiplexing means is comprised of a first and a second tristate inverter, said first tristate inverter receiving at least one input control signal from said true input select signal, said second tristate inverter receiving at least one input control signal from said complement input select signal.

12. The system of claim 10 further comprising a test enable circuit for ensuring that said true input select signal and said complement input select signal are not simultaneously enabled.

13. The system of claim 10 further comprising circuitry coupled to the output of said XNOR logic device for enabling said true input select signal in response to detecting a first occurrence of a non-complementary condition at the output of said complementary logic circuit.

14. The system of claim 13 further comprising circuitry coupled to the output of said XNOR logic device for enabling said complement input select signal in response to detecting a second occurrence of a non-complementary condition at the output of said complementary logic circuit.

15. The system of claim 1 wherein said logic means coupled to the output of said complementary logic circuit further comprises an XNOR logic device for evaluating said true and complement output signal s from said complementary logic circuit.

16. A method for detecting and rectifying a proscribed non-complementary output from a complementary logic circuit having a true tree and a complement tree, said method comprising the steps of:

generating a true signal utilizing said true tree, said true signal utilized to produce a true output signal from said complementary logic circuit, and generating a complement signal utilizing said complement tree, said complement signal utilized to produce a complement output signal from said complementary logic circuit;

detecting an occurrence of a non-complementary condition at the output of said complementary logic circuit; and in response to said step of detecting an occurrence of a non-complementary condition, selectively replacing said true signal with said complement signal within said true tree, such that said complement tree may be utilized to rectify a non-complementary condition at the output of said complementary logic circuit.

17. The method of claim 16 wherein said step of selectively replacing said true signal with said complement signal comprises multiplexing said complement signal into said true tree.

18. The method of claim 16 further comprising the step of selectively replacing said complement signal with said true signal within said complement tree, such that said true tree may be utilized to rectify a non-complementary condition at the output of said complementary logic circuit.

19. The method of claim 18 wherein said step of selectively replacing said complement signal with said true signal comprises multiplexing said true signal into said complement tree.

* * * * *